United States Patent
Mitsui

(10) Patent No.: US 9,528,878 B2
(45) Date of Patent: Dec. 27, 2016

(54) IMAGING APPARATUS AND MICROSCOPE SYSTEM HAVING THE SAME

(71) Applicant: OLYMPUS CORPORATION, Tokyo (JP)

(72) Inventor: Masanori Mitsui, Machida (JP)

(73) Assignee: OLYMPUS CORPORATION, Tokyo (JP)

( * ) Notice: Subject to any disclaimer, the term of this patent is extended or adjusted under 35 U.S.C. 154(b) by 464 days.

(21) Appl. No.: 14/074,892

(22) Filed: Nov. 8, 2013

(65) Prior Publication Data

US 2014/0078285 A1    Mar. 20, 2014

Related U.S. Application Data

(63) Continuation of application No. PCT/JP2012/061091, filed on Apr. 25, 2012.

(30) Foreign Application Priority Data

May 17, 2011 (JP) .................. 2011-110212

(51) Int. Cl.
*G01J 3/40* (2006.01)
*H04N 9/04* (2006.01)
(Continued)

(52) U.S. Cl.
CPC .............. *G01J 3/40* (2013.01); *G01J 3/0248* (2013.01); *G01J 3/12* (2013.01); *G02B 21/0004* (2013.01);
(Continued)

(58) Field of Classification Search
CPC .................... G01J 3/40; H04N 9/64
See application file for complete search history.

(56) References Cited

U.S. PATENT DOCUMENTS

2006/0188150 A1    8/2006  Katsumata et al.
2006/0279647 A1   12/2006  Wada et al.
(Continued)

FOREIGN PATENT DOCUMENTS

JP    63-238785 A    10/1988
JP    6-351027 A     12/1994
(Continued)

OTHER PUBLICATIONS

International Search Report dated Jul. 31, 2012 issued in PCT/JP2012/061091.

*Primary Examiner* — Tung Vo
*Assistant Examiner* — Rowina Cattungal
(74) *Attorney, Agent, or Firm* — Scully, Scott, Murphy & Presser, P.C.

(57) ABSTRACT

Disclosed is an imaging apparatus including: a spectroscopic measurement section configured to measure a spectral characteristic of a subject; a spectral image capture section configured to capture a subject image separated into a plurality of colors through color separation to create a plurality of spectral images; and a color separation characteristic determining section configured to determine a color separation characteristic to be used for image capturing of the spectral image capture section, based on the spectral characteristic of the subject measured by the spectroscopic measurement section. The color separation characteristic determining section determines a count of color separations in the image capturing of the spectral image capture section and spectral bands corresponding to each of the color separations.

13 Claims, 9 Drawing Sheets

(51) Int. Cl.
*G01J 3/02* (2006.01)
*G02B 21/36* (2006.01)
*G02B 21/00* (2006.01)
*H04N 5/225* (2006.01)
*H04N 9/64* (2006.01)
*G01J 3/12* (2006.01)

(52) U.S. Cl.
CPC ............ *G02B 21/36* (2013.01); *G02B 21/365* (2013.01); *H04N 5/2256* (2013.01); *H04N 9/04* (2013.01); *H04N 9/045* (2013.01); *H04N 9/64* (2013.01); *G01J 2003/1217* (2013.01); *G01J 2003/1221* (2013.01)

(56) References Cited

U.S. PATENT DOCUMENTS

| | | | |
|---|---|---|---|
| 2007/0064119 A1* | 3/2007 | Komiya | H04N 9/735 348/222.1 |
| 2008/0158377 A1 | 7/2008 | Chanas et al. | |
| 2009/0010537 A1* | 1/2009 | Horie | G09G 5/02 382/167 |

FOREIGN PATENT DOCUMENTS

| | | |
|---|---|---|
| JP | 09-061244 A | 3/1997 |
| JP | 2002-281513 A | 9/2002 |
| JP | 2005-114530 A | 4/2005 |
| JP | 2005-167444 A | 6/2005 |
| JP | 2005-260480 A | 9/2005 |
| JP | 2005-341175 A | 12/2005 |
| JP | 2008-532449 A | 8/2008 |
| JP | 2009-237817 A | 10/2009 |

* cited by examiner

IMAGING APPARATUS AND MICROSCOPE SYSTEM HAVING THE SAME

CROSS REFERENCE TO RELATED APPLICATIONS

This application is a continuation of International Patent Application No. PCT/JP2012/061091, filed on Apr. 25, 2012, which claims the benefit of Japanese Patent Application No. JP 2011-110212, filed on May 17, 2011, which are incorporated by reference as if fully set forth.

TECHNICAL FIELD

The present invention relates to an imaging apparatus capable of collecting spectral information on a photographic subject and accurately reproducing colors, and a microscope system using the same.

BACKGROUND ART

There is known a technique of an imaging apparatus, in which shooting (i.e. image capturing) is performed through color separation into four or more colors, and high color reproducibility is obtained by expanding a reproducible color gamut. In addition, there is known a technique, in which a spectral characteristic of a subject can be obtained by shooting an image with multiple bands, and the image is reproduced by excluding an observer's metamerism influence or a spectral characteristic of illumination light used to illuminate the subject during the shooting.

In JP 9-61244A, there is disclosed a color classification device. This color classification device includes a measurement filter group and a test filter group, each of which having a plurality of filters having different spectral transmittance characteristics. A spectral characteristic of a target object is obtained by measuring the target object while the test filter is switched. In addition, an effective measurement filter is selected from the measurement filter group based on the result detected using the test filter, and switching is performed to the effective measurement filter.

In JP 2009-237817A, there is disclosed a spectral image creating device including a first image sensor having a first spatial resolution and a first wavelength resolution and a second image sensor having a second spatial resolution higher than the spatial resolution of the first image sensor and a second wavelength resolution lower than the first wavelength resolution of the first image sensor. In this spectral image creating device, a transform matrix is created from the image data obtained by the first image sensor. In addition, a spectral image is obtained by applying the transform matrix to the image data obtained by the second image sensor.

SUMMARY OF INVENTION

According to an embodiment of the invention, there is provided an imaging apparatus including: a spectroscopic measurement section configured to measure a spectral characteristic of a subject; a spectral image capture section configured to capture a subject image separated into a plurality of colors through color separation to create a plurality of spectral images; and a color separation characteristic determining section configured to determine a color separation characteristic to be used for image capturing of the spectral image capture section, based on the spectral characteristic of the subject measured by the spectroscopic measurement section. The color separation characteristic determining section determines a count of the color separations in the image capturing of the spectral image capture section and respective spectral bands corresponding to each of the separated colors.

The foregoing and additional features and characteristics of this disclosure will become more apparent from the following detailed description considered with the reference to the accompanying drawings.

DESCRIPTION OF EMBODIMENTS

First Embodiment

Figure 1:
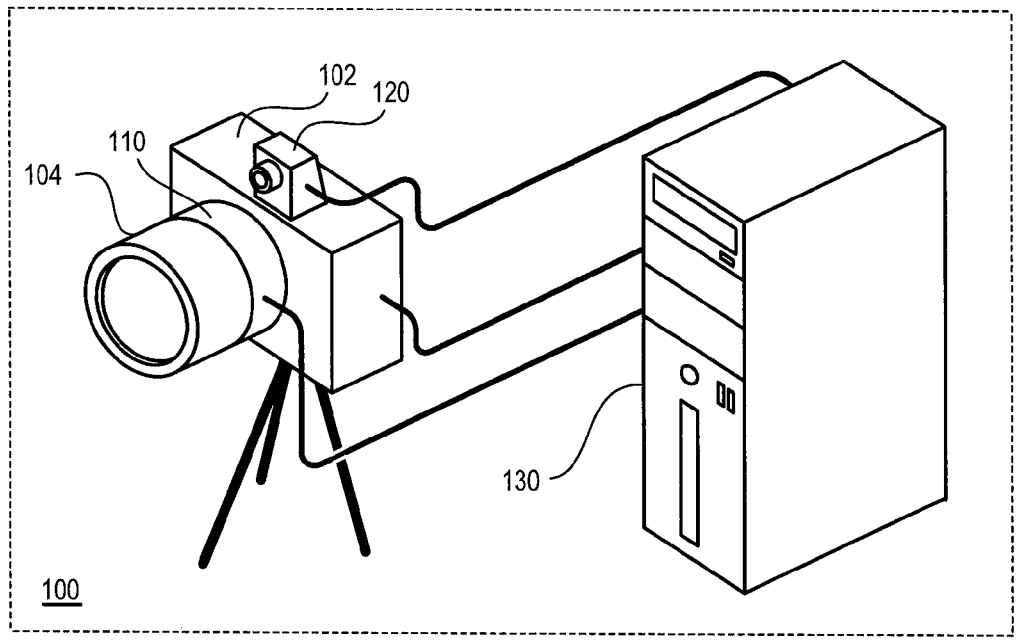
FIG. 1 is a perspective view illustrating a configuration of an imaging apparatus according to a first embodiment of the invention.
Figure 2:
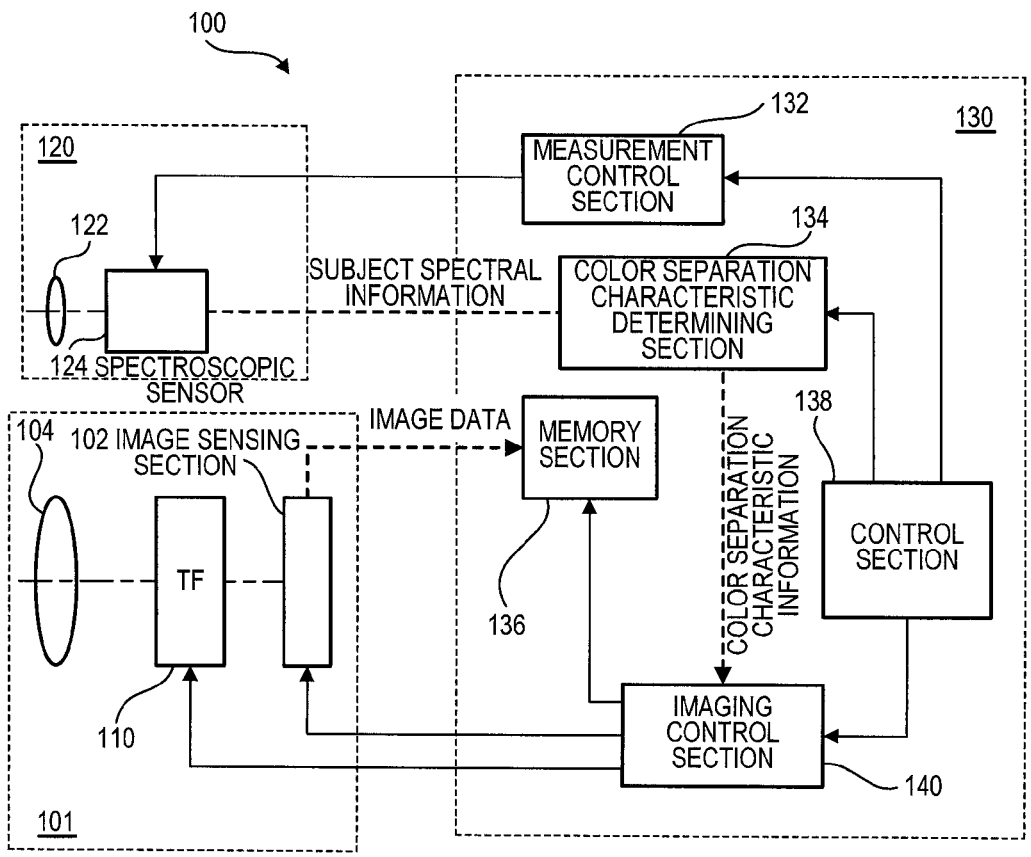
FIG. 2 is a block diagram illustrating an internal configuration of the imaging apparatus according to the first embodiment of the invention.

In the first embodiment, description will be made for an example of a still imaging apparatus according to the invention. FIG. 1 is a diagram illustrating a schematic configuration of an imaging apparatus 100 (i.e. image capturing apparatus) according to a first embodiment of the invention. FIG. 2 is a block diagram schematically illustrating an internal configuration of the imaging apparatus 100. The imaging apparatus 100 includes an image sensing section 102, a tunable filter (denoted by "TF" in FIG. 2) 110, a photographic lens 104, a spectroscopic measurement section 120, and a controller 130.

The image sensing section 102 includes a shutter, an image sensor, and an image processing section configured to process an image signal output from the image sensor to create image data. The photographic lens 104 forms a subject image on a light-receiving surface of the image sensor of the image sensing section 102. The photographic lens 104 may be fixed to the image sensing section 102 in an irremovable manner or may be installed in a replaceable manner.

The tunable filter 110 is interposed between the photographic lens 104 and the image sensing section 102. A liquid crystal tunable filter or an acousto-optical variable wavelength filter may be used as the tunable filter 110. The tunable filter is a bandpass filter having a variable spectral transmittance characteristic. That is, the tunable filter 110 is a bandpass filter capable of changing a bandpass characteristic, that is, capable of changing a wavelength bandwidth of transmittable light and a center wavelength thereof.

The image sensing section 102, the tunable filter 110, and the photographic lens 104 described above constitute a spectral image capture section 101. That is, the spectral image capture section 101 performs shooting (i.e. image capturing) several times using the image sensing section 102 while changing the spectral transmittance characteristic of the tunable filter 110. As a result, it is possible to capture the subject image formed by the photographic lens 104 and separated into a plurality of colors to create a set of spectral images.

The spectroscopic measurement section 120 includes a spectroscopic sensor 124 and a condensing lens 122. The spectroscopic sensor 124 is capable of measuring a spectral radiance characteristic of the photographic subject (object). For example, the spectroscopic sensor 124 converts the incident light into parallel light and guides it to the grating (diffraction grating), where the light is spectroscopically diffracted. The diffracted light is received by the line sensor, and a spectral radiance can be measured based on a magnitude of the signal output from each pixel. In the following description, a spectroscopic measurement method based on such diffraction will be referred to as a diffraction spectroscopic measurement type. Alternatively, the spectroscopic sensor 124 may have an on-chip color filter consisting of a plurality of numbers of colors formed on pixels of an area sensor where pixels are 2-dimensionally arranged and measure the spectral radiance based on the magnitude of the signal output from each pixel. That is, in a typical single-chip image sensor, blue, green, and red on-chip color filters are 2-dimensionally arranged in a Bayer array or the like with regularity. However, it is possible to perform spectroscopic measurement by increasing the number of colors of the on-chip color filter. In this case, the number of colors may be variously set depending on a specification of the imaging apparatus 100 or the like. In the following description, a spectroscopic measurement method using such an image sensor will be referred to as an imager spectroscopic measurement type. In the case of the imager spectroscopic measurement type, for example, the on-chip color filter has 64 pixels formed by a total of 64 colors consisting of 8 colors in a horizontal direction by 8 colors in a vertical direction, and the 64 pixels are used as a single spectroscopic measurement unit. The spectroscopic measurement unit may be further arranged along the horizontal and vertical directions so as to form a spectroscopic measurement element capable of multipoint measurement.

The condensing lens 122 determines a measurement field of the spectroscopic measurement section 120. The measurement field of the spectroscopic measurement section 120 may match a view field of the photographic lens 104. Alternatively, a focal length of the condensing lens 122 or the like may be determined such that a spectral radiance characteristic of a subject is measured within a part of the view field of the photographic lens 104. When the spectroscopic sensor 124 can perform multipoint measurement as described above using the imager spectroscopic measurement type, a spectral radiance characteristic of a subject may be measured in each position within the measurement field.

As described above, the spectroscopic measurement section 120 measures the spectral radiance characteristic of the subject (object). However, for example, the spectroscopic measurement section 120 may measure a spectral radiance characteristic of the subject by irradiating illumination light having an existing spectral distribution onto a subject.

The controller 130 may include, for example, a personal computer (PC) having a central processing unit (CPU) and a memory and software executed on the PC. Alternatively, the controller 130 may include dedicated hardware (for example, electronic circuit). The controller 130 includes a measurement control section 132, a color separation characteristic determining section 134, a memory section 136, a control section 138, and an imaging control section 140.

The control section 138 controls an operation timing when the operation described below is performed by the measurement control section 132, the color separation characteristic determining section 134, and the imaging control section 140. Before the shooting operation (image capturing operation) of the image sensing section 102, the control section 138 sends a control signal for starting measurement to the measurement control section 132. Similarly, the control section 138 sends a control signal for starting a color separation characteristic determining process to the color separation characteristic determining section 134. The measurement control section 132 receives this control signal and sends a control signal to the spectroscopic measurement section 120. As a result, the spectroscopic measurement section 120 measures the spectral characteristic of the subject. Based on the measurement result, the spectroscopic measurement section 120 outputs the spectral information on the subject to the color separation characteristic determining section 134.

The color separation characteristic determining section 134 determines a color separation characteristic based on the subject spectral information received from the spectroscopic measurement section 120. This color separation characteristic relates to the number of color separations (that is, the number of colors) used for the spectral image capture section 101 to perform shooting (i.e. image capturing) by separating the subject image into a plurality of colors to create a set of spectral images and a spectral wavelength band set by the spectral image capture section 101 for each color separation (that is, for each of colors).

Figure 3:
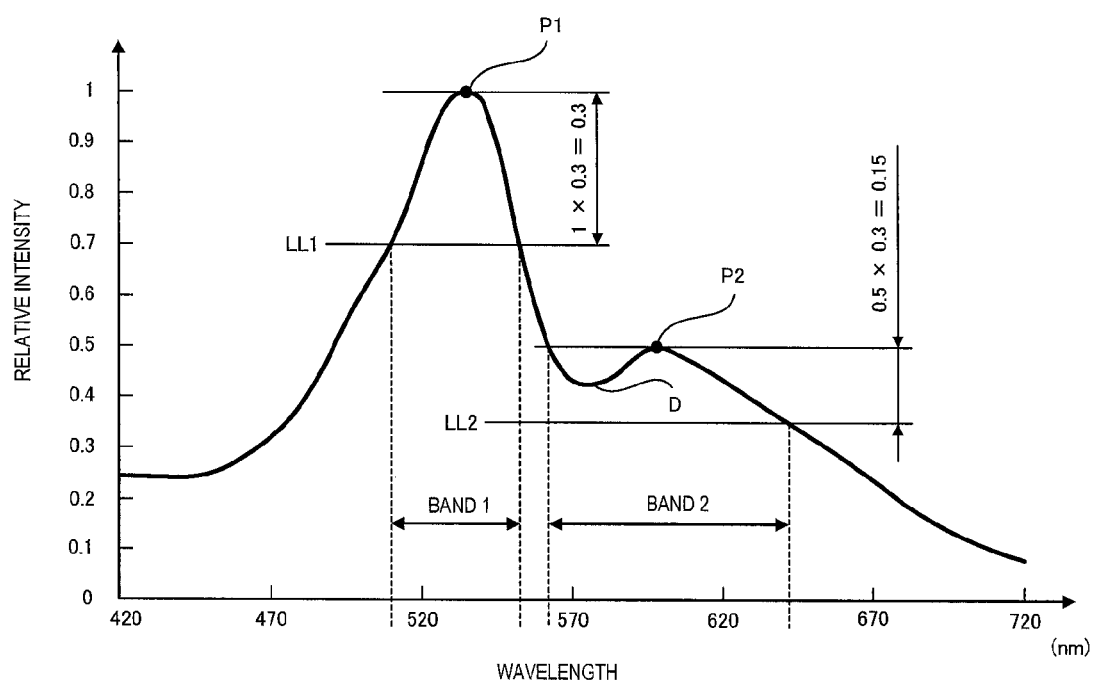
FIG. 3 is a diagram conceptually illustrating a sequence for determining a color separation characteristic from a spectral characteristic of a subject obtained from a spectroscopic measurement section.

Here, a sequence of determining the color separation characteristic by the color separation characteristic determining section 134, that is, the number of color separations and the spectral wavelength band corresponding to each color separation to be used in the spectral image capture section 101, will be described with reference to FIG. 3. FIG. 3 is a diagram illustrating an example of a spectral intensity of a subject obtained through measurement of the spectroscopic measurement section 120, in which the abscissa denotes a wavelength, and the ordinate denotes a relative value of the spectral intensity. A spectral intensity curve illustrated in FIG. 3 has two peaks P1 and P2. The peak P1 is located in the vicinity of a wavelength of 540 nm (green), and the peak P2 is located in the vicinity of a wavelength of 600 nm (orange). A relative intensity of the peak P1 is set to "1," and a relative intensity of the peak P2 is set to "0.5." In the example of FIG. 3, a profile is relatively steep in the wavelength region around the peak P1, and a profile is relatively smooth in the wavelength region around the peak P2.

The color separation characteristic determining section 134 specifies a peak position or a valley (dip) position from the spectral intensity curve illustrated in FIG. 3. Whether the peak position or the dip position is specified may be appropriately selected depending on the type of the subject. For example, when shooting is performed for a typical subject illuminated by an illumination light, a peak position is preferably specified. Meanwhile, when a subject is transmissively illuminated as in stained glass or when a prepared specimen of a microscope is illuminated from the back side, the dip position is preferably employed because it facilitates recognition of a color characteristic. Here, it is assumed that, for example, a typical subject is employed to specify the peak position.

In the example of FIG. 3, the spectral intensity curve is analyzed to detect two peaks P1 and P2. Then, lower limits LL1 and LL2 are set based on each peak value (P1=1, P2=0.5). For example, the lower limit LL1 is set to "0.7," which is obtained by subtracting a value obtained by multiplying "0.3" by the peak value "1" of the peak P1 from the peak value "1." Similarly, the lower limit LL2 is set to "0.35," which is obtained by subtracting a value obtained by multiplying "0.3" by the peak value "0.5" of the peak P2 from the peak value "0.5." That is, 70% of the peak value is obtained as the lower limit. Various methods may be employed to obtain such a lower limit. For example, the lower limit may be obtained by subtracting a uniform value from each peak value.

In the spectral intensity curve, a wavelength range whose relative intensity exceeds the lower limit LL1 is set as a band 1. Similarly, a band 2 is set. However, in the spectral intensity curve of FIG. 3, since a value of the bottom (local minimum) of the dip D existing in the short wavelength side from the peak P2 is greater than the lower limit LL2, a point corresponding to the lower limit LL2 does not exist in the vicinity of the short wavelength side of the peak P2. In this case, a position exceeding the peak P2 may be set as one end of the band 2 by further increasing a search range. Such an example is illustrated in FIG. 3. Meanwhile, for the other end of the band 2 positioned in the long wavelength side from the peak P2, the band 2 is set while the point corresponding to the lower limit LL2 exists in the spectral intensity curve of FIG. 3. In this manner, in the example of FIG. 3, a width of approximately 40 nm (from 510 nm to 550 nm) is set for the band 1, and a width of approximately 80 nm (from 560 nm to 640 nm) is set for the band 2.

Subsequently, as the positions of the peaks P1 and P2 of the spectral intensity that characterize colors of a subject are detected, bands are set depending on a fluctuation of the spectrum change in wavelength areas around the peaks P1 and P2. That is, in the area where a spectrum change is relatively abrupt, a relatively narrow bandwidth (bandwidth 1) is set. On the contrary, in the area where a spectrum change is relatively smooth, a relatively wide bandwidth (bandwidth 2) is set.

Depending on the spectrum pattern (spectral intensity curve), a plurality of bands may overlap with each other if the bands are set based on the aforementioned method. In this case, a plurality of bands may remain in the overlapping state, or the overlapping may be prevented by dividing the bands with respect to a center wavelength between the neighboring peak wavelengths.

A wavelength area that does not belong to any band may be allocated as a separate band or may be excluded from the shooting as an unnecessary band.

When the bandwidth is set by detecting a dip position in the spectral intensity, the upper limit may be set based on the value of each dip (local minimum value) instead of the lower limit, and the bandwidth may be provided using a wavelength in the spectral intensity curve corresponding to the upper limit. In this case, the upper limit may be obtained by adding a constant value (positive value) to the local minimum value of each detected dip or may be obtained by multiplying each local minimum value by a value greater than "1." When the upper limit set in this manner is excessively high so as to excessively widen the bandwidth, or when a value in the spectral intensity curve corresponding to the upper limit does not exist, the bandwidth may be obtained again by gradually reducing the upper limit.

In this manner, the color separation characteristic determining section 134 determines the number of color separations "n" (in the aforementioned example, n=2) and the spectral wavelength band (in the aforementioned example, bandwidth 1 and bandwidth 2) corresponding to each color separation. As apparent from the aforementioned description, the shooting count "n" (that is, the number of color separations "n") changes depending on the spectral characteristic of the photographic subject (object). In an extreme example, when the illumination light used to illuminate a subject during the shooting has a short wavelength or a wavelength close thereto, or when a subject has a monochrome or achromatic color or a color close thereto, there is a possibility that the shooting count becomes "1." That is, since the shooting count or the spectral wavelength band is set as many as necessary, it is possible to suppress the shooting operation or the image data from unnecessarily increasing.

The color separation characteristic determining section 134 outputs, to the imaging control section 140, the color separation characteristic determined as described above, that is, the color separation characteristic information including the number of color separations "n" and information capable of specifying the spectral wavelength band 1, the spectral wavelength band 2, . . . , and the spectral wavelength band n. Before and after this operation, the control section 138 sends a control signal for starting the shooting operation to the imaging control section 140. As this control signal is received, the imaging control section 140 outputs each control signal for the image sensing section 102 and the tunable filter 110 based on the color separation characteristic information received from the color separation characteristic determining section 134. The tunable filter 110 changes the spectral transmittance characteristic based on the control signal received from the imaging control section 140.

As a result, the spectral image capture section 101 performs the shooting operation (image capturing operation) as described below. That is, a first shooting operation is performed by setting the spectral transmittance characteristic of the tunable filter 110 to match the spectral wavelength band 1. Subsequently, a second shooting operation is performed by setting the spectral transmittance characteristic of the tunable filter 110 to match the spectral wavelength band 2. Subsequently, in a similar manner, the shooting operation is performed by setting the spectral transmittance characteristic of the tunable filter 110. Finally, the (n)th shooting operation is performed by setting the spectral transmittance characteristic of the tunable filter 110 to match the spectral wavelength band n. In this manner, the (n)th shooting operation is performed while the spectral image capture section 101 sets a different spectral wavelength band. As described above, the number "n" may be "1" or greater.

The image data created by the image sensing section 102 through the "n" shooting operations are output to the memory section 136. The imaging control section 140 adds tag information to the image data and assigns a file name according to a predetermined naming rule.

Figure 4:
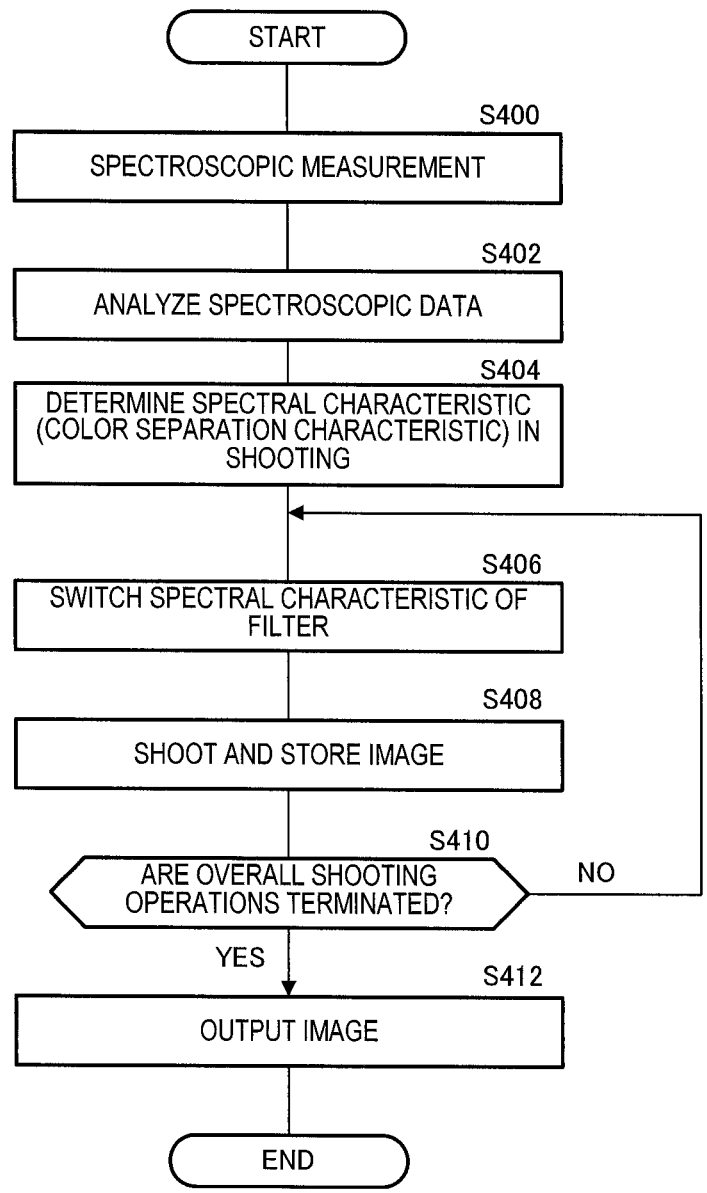
FIG. 4 is a flowchart illustrating a shooting control sequence executed by a controller.

FIG. 4 is a flowchart illustrating a process sequence executed by the controller 130 when the shooting operation is performed using the imaging apparatus 100. The process sequence of FIG. 4 starts when a user of the imaging apparatus 100 makes a shooting start manipulation.

In step S400, the controller 130 outputs a control signal for starting the spectroscopic measurement to the spectroscopic measurement section 120. As a result, the spectroscopic measurement section 120 performs a spectroscopic measurement operation. The process of step S400 corresponds to the process of the measurement control section 132 in FIG. 2.

In step S402, the controller 130 analyzes the spectroscopic data. That is, the controller 130 obtains the subject spectral information created through the spectroscopic measurement from the spectroscopic measurement section 120 and analyzes the subject spectral information. Subsequently, in step S404, the controller 130 deter mines the spectral characteristic in the shooting, that is, the color separation characteristic described above, using the method described in conjunction with FIG. 3. The process of steps S402 and S404 corresponds to the process of the color separation characteristic determining section 134 in FIG. 2.

In step S406, the controller 130 switches the spectral characteristic of the filter. That is, the controller 130 controls the spectral transmittance characteristic of the tunable filter 110 such that the color separation characteristic determined in step S404 is obtained. In step S408, the controller 130 outputs a control signal for the shooting and recording to the image sensing section 102. In step S410, the controller 130 determines whether or not overall shooting operations have been completed. While it is determined "NO," the process of steps S406 and S408 is repeatedly performed. If it is determined "YES" in step S410, the process advances to step S412. The process of steps S406, S408, and S410 described above corresponds to the process of the imaging control section 140 in FIG. 2. That is, the process of steps S406 and S408 is repeatedly performed as frequent as the number of separated colors n. In this case, the spectral transmittance characteristic of the tunable filter 110 is sequentially switched.

If it is determined "YES" in step S410, in step S412, the controller 130 performs a process of creating and outputting spectral image data based on overall image data obtained through a series of shooting operations. The process of outputting the spectral image data includes a process of storing the data in the memory section 136 in a predetermined file format, a process of displaying the data on a display unit, a process of outputting the data to other information processing devices, a process of printing the data, and the like. After the outputting of the spectral image data in step S412, the controller 130 terminates the shooting process sequence.

As described above, according to the first embodiment, the color separation characteristic in the shooting is determined based on a spectral characteristic of a subject obtained by the spectroscopic measurement section 120. Based on this color separation characteristic, the spectral image capture section 101 performs shooting (image capturing) using a count of color separations (or the number of the separated colors) corresponding to the spectral characteristic of the subject and a spectral wavelength band corresponding to each of the color separations (or separated colors). In this manner, the spectral characteristic of the subject is analyzed, and the shooting is performed by restricting the spectral wavelength band and the number of separated colors to values optimal to obtain spectral information on a subject. Therefore, it is possible to reduce the time elapsing until a series of shooting operations are terminated and reduce an image data amount. In addition, since the image data amount is reduced, it is possible to also reduce a load or time for processing the image data. Furthermore, it is possible to reduce time necessary to transmit the image data.

Modification

Figure 5:
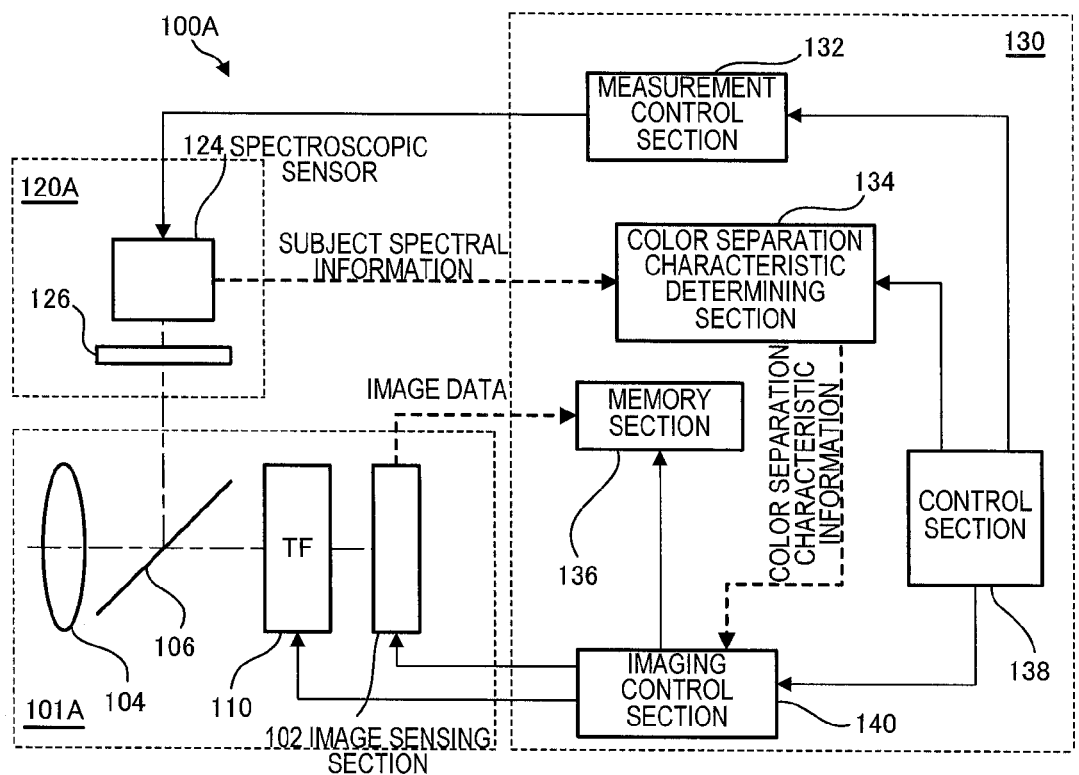
FIG. 5 is a block diagram illustrating an internal configuration of an imaging apparatus according to a modification of the first embodiment of the invention.

Although, in the aforementioned description, the spectroscopic measurement section 120 has a separate metering window type configuration, the spectroscopic measurement section 120 may also have a through-the-lens (TTL) metering type configuration. An example of the TTL type will be described with reference to FIG. 5. In FIG. 5, like reference numerals denote like elements as in FIG. 2, and description thereof will not be repeated. Instead, description will focus on a difference of the configuration from FIG. 2.

Referring to FIG. 5, the imaging apparatus 100A includes a spectral image capture section 101A, a spectroscopic measurement section 120A, and a controller 130. The spectral image capture section 101A includes a half mirror 106 as an optical path splitting member in addition to the photographic lens 104, the tunable filter 110, and the image sensing section 102. This half mirror 106 is arranged in an optical path of the subject light transmitting through the photographic lens 104 between the photographic lens 104 and the tunable filter 110. In addition, a part of the subject light is guided to the spectroscopic measurement section 120A, and the remaining subject light is guided to the tunable filter 110. Furthermore, the half mirror 106 may be a total reflection mirror or an equivalent thereof. Similar to a main mirror of a single-lens reflex camera, the optical path may be switched such that the subject light is guided to any one of the spectroscopic measurement section 120A and the image sensing section 102 during the shooting preparation operation or the exposure operation.

The spectroscopic measurement section 120A receives the subject light guided by the half mirror 106 without a condensing lens 122 provided in the spectroscopic measurement section 120 of FIG. 2. Preferably, the imager spectroscopic measurement type spectroscopic sensor 124 described above is employed. An optical member 126 for reducing a spatial frequency is arranged in a position crossing the optical path of the subject light incident to the spectroscopic sensor 124. An optical lowpass filter or the like may be employed as the optical member 126. Here, in the spectroscopic sensor 124, for example, a single unit of the spectroscopic sensor is configured to have 36 pixels formed with on-chip color filters capable of reproducing a total of 36 colors in a 2-dimensional array including 6 pixels of a horizontal direction and 6 pixels of a vertical direction, and the units of the spectroscopic sensor are further arranged in a 2-dimensional array. In the single unit of the spectroscopic sensor having 36 pixels and the on-chip color filter capable of reproducing 36 colors formed on the corresponding pixels, the light beams are preferably incident in a uniformly mixed manner from the viewpoint of more accurate spectroscopic measurement. The optical characteristic of the optical member 126 is preferably set such that the light beams of the subject light incident to each unit of the spectroscopic sensor are uniformly mixed.

However, when a size of the light-receiving area (image area) of the image sensing section 102 is different from a size of the light-receiving area of the spectroscopic sensor 124, it is preferable that an image re-forming optical system and the like be arranged between the half mirror 106 and the spectroscopic measurement section 120A. As a result, a size of the subject image formed on a light-receiving surface of the spectroscopic sensor 124 can be reduced or enlarged depending on a size of the light-receiving area of the spectroscopic sensor 124.

When the diffraction spectroscopic measurement type spectroscopic sensor 124 described above is employed, a diffuser may be used as the optical member 126. The diffuser may be a transparent plate made of glass or resin provided with minute embossing on a surface such as ground glass or a glass or resin plate having milky white optical diffusing substances dispersed inside.

The spectroscopic measurement section 120A may measure the spectral characteristic of the subject within a range substantially equal to the shooting field (image-capturing field) of the spectral image capture section 101A. In terms of photometry, this corresponds to front side photometry, average photometry, and the like. The spectroscopic measurement section 120A may measure the spectral characteristic of the subject within a part of the range of the shooting field of the spectral image capture section 101A. This corresponds to partial photometry, center-weighted photometry, spot photometry, and the like. In particular, when an imager spectroscopic measurement type spectroscopic sensor 124 is used together with an optical lowpass filter, an arbitrary area within the shooting range may be selected manually or automatically depending on a shooting situation to measure a spectral characteristic corresponding to the selected area. This corresponds to multi-zone photometry. For example, in order to increase, particularly, color reproducibility of a main subject by excluding a background influence, the spectroscopic measurement section 120A may measure a spectral characteristic within a range where the main subject exists, and the color separation characteristic determining section 134 may determine a color separation characteristic based on the measurement result thereof.

In the configuration of FIG. 5, it is possible to accurately obtain; by the spectroscopic measurement section 120A, spectral information on a subject depending on a change of the viewing angle even when the photographic lens 104 is replaced with one that has a different focal length, or a zoom-in/out operation is performed. In addition, no parallax occurs in the measurement field of the spectroscopic measurement section 120A even when the shooting distance (zoom ratio) changes. Furthermore, it is possible to obtain subject spectral information including the spectral transmittance characteristic of the photographic lens 104.

Second Embodiment

Figure 6:
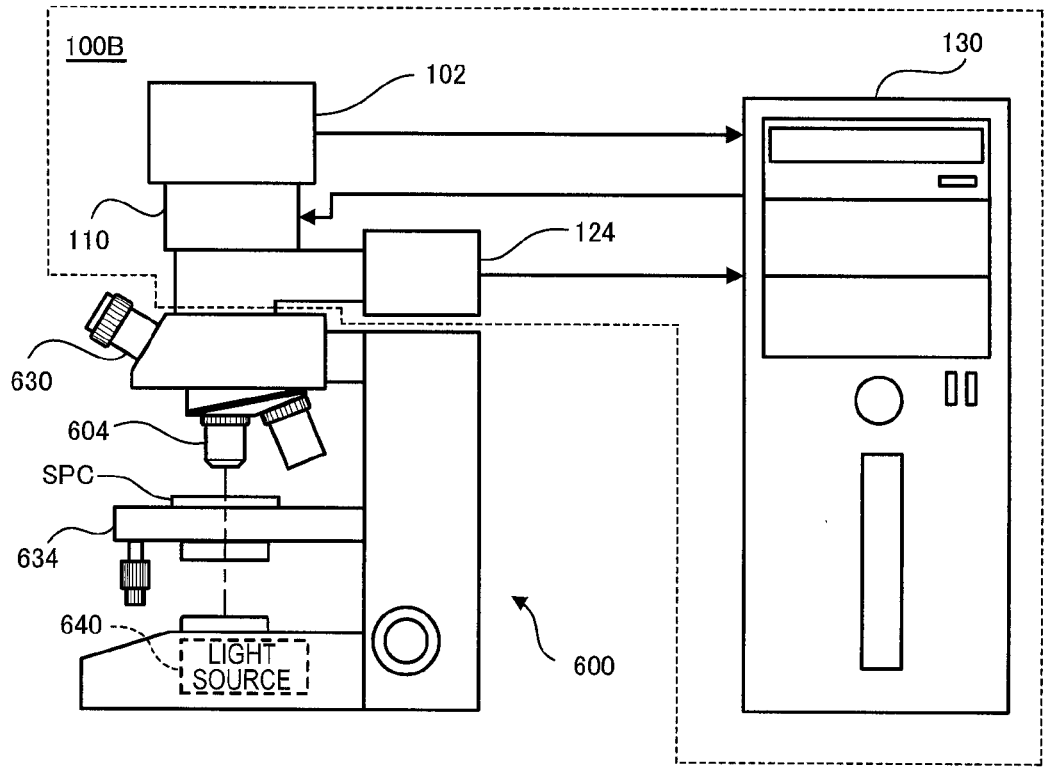
FIG. 6 is a diagram illustrating an exemplary configuration of an imaging apparatus installed in a microscope according to a second embodiment of the invention.

According to the second embodiment, the imaging apparatus 100B is incorporated into a microscope. FIG. 6 illustrates the imaging apparatus 100B installed in the microscope 600. In FIG. 6, like reference numerals denote like elements as in the imaging apparatus 100 of the first embodiment, and description thereof will not be repeated. The imaging apparatus 100B is a microscope imaging apparatus and includes a spectroscopic sensor 124, a tunable filter 110, an image sensing section 102, and a controller 130.

The microscope 600 includes an object lens 604, an eyepiece lens 630, a stage 634, and a light source 640. A specimen SPC is laid on the stage 634 and is illuminated by the light source 640 from the back side of the specimen SPC. As a result, it is possible to observe an enlarged image by the object lens 604 and the eyepiece lens 630.

Figure 7:
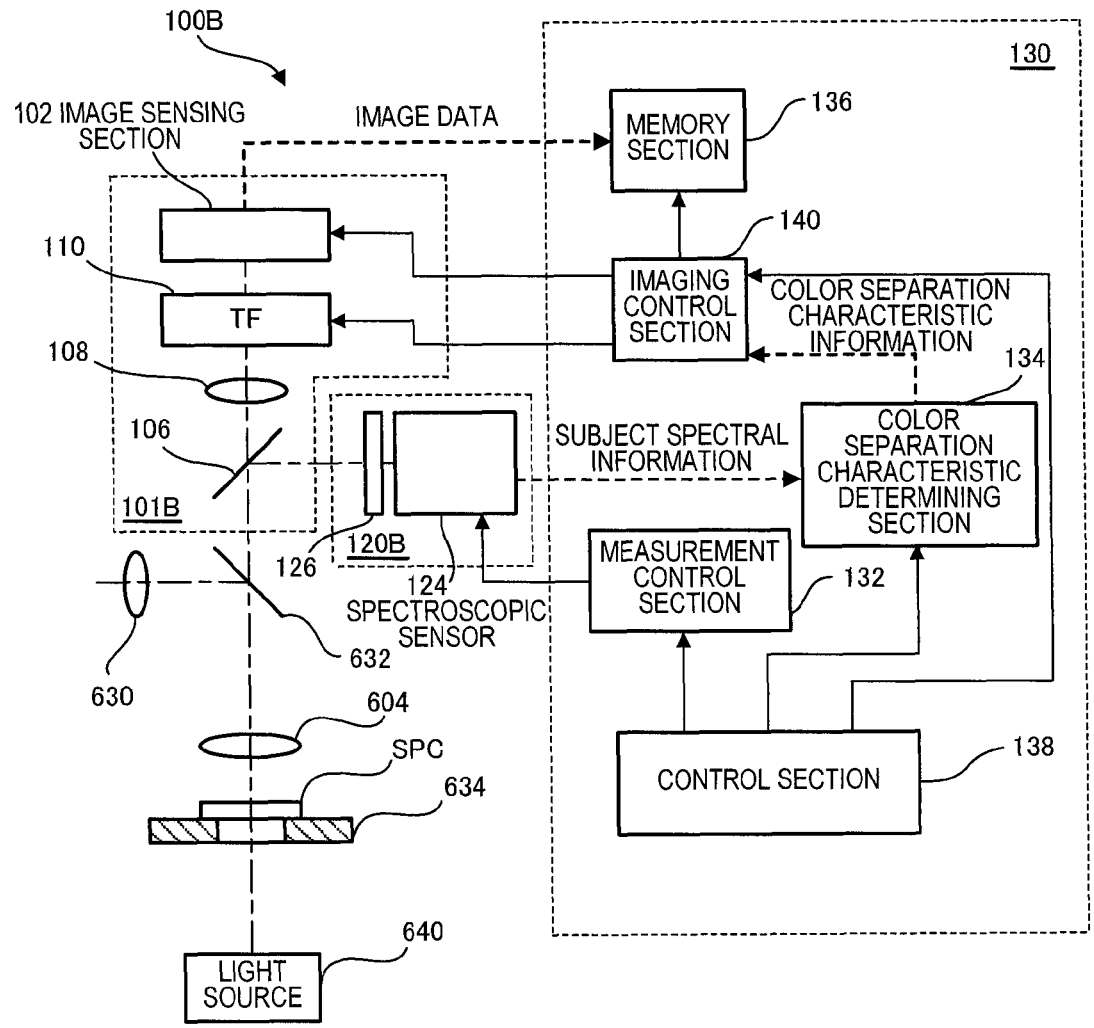
FIG. 7 is a block diagram illustrating an internal configuration of the imaging apparatus according to the second embodiment of the invention together with a part of elements of the microscope.

FIG. 7 is a block diagram illustrating an internal configuration of the imaging apparatus 100B along with a part of the elements of the microscope 600. In FIG. 7, like reference numerals denote like elements as in the imaging apparatus 100 of the first embodiment, and description thereof will not be repeated. The imaging apparatus 100B includes a spectral image capture section 101B, a spectroscopic measurement section 120B, and a controller 130. The spectral image capture section 101B includes an image sensing section 102, a tunable filter 110 (TF in FIG. 7), an image forming optical system 108, and a half mirror 106. The image sensing section 102 performs shooting several times by switching the spectral transmittance characteristic of the tunable filter 110. As a result, it is possible to perform the shooting by separating a subject image formed by the photographic lens 104 into a plurality of colors to create a set of spectral images. The spectroscopic measurement section 120B includes an optical member 126 and a spectroscopic sensor 124.

The microscope 600 has a half mirror 632 for dividing the light from the specimen SPC transmitting through the object lens 604 (hereinafter, referred to as subject light) and guiding the divided light into both the eyepiece lens 630 and the spectral image capture section 101B.

A part of the subject light transmitting through the half mirror 632 and incident to the spectral image capture section 101B is guided by the half mirror 106 to the spectroscopic measurement section 120B, and the remaining subject light is guided to the image forming optical system 108.

The optical member 126 is a diffuser for diffusing the subject light guided by the half mirror 106. The optical member 126 may be a transparent plate made of glass or resin provided with minute embossing on a surface such as ground glass or a glass or resin plate having milky white optical diffusing substances dispersed inside.

The spectroscopic sensor 124 may be either a diffraction spectroscopic measurement type or an imager spectroscopic measurement type. The spectroscopic sensor 124 may measure a spectral characteristic of a specimen SPC as a subject for a range substantially equal to the shooting field determined by a combination of the object lens 604 and the spectral image capture section 101B or for a part of the range of the shooting field. In either case, light beams of the subject light mixed by the optical member 126 are incident onto the light-receiving surface of the spectroscopic sensor 124. That is, the light beams obtained by mixing overall light within the measurement field of the spectroscopic measurement section 120B are incident onto the light-receiving surface of the spectroscopic sensor 124.

The subject light transmitting through the half mirror 106 forms an image through the image forming optical system 108, and the subject image, that is, an image of the specimen SPC is formed on the light-receiving surface of the image sensing section 102.

For observation, a user observes the enlarged image of the specimen SPC through the eyepiece lens 630 and manipulates the stage 634 such that a main part of the specimen SPC is positioned in the center of the view field. Then, as a user performs a shooting manipulation, the controller 130 controls the spectral image capture section 101B and the spectroscopic measurement section 120B as described in the first embodiment so that a series of shooting operations are performed. That is, the color separation characteristic in the shooting is determined based on the spectral characteristic of the specimen SPC obtained by the spectroscopic measurement section 120B. The spectral image capture section 101B performs the shooting (image-capturing) based on the color separation characteristic. As a result, the shooting is performed using the number of color separations corresponding to the spectral characteristic of a specimen SPC, that is, a subject, and a spectral wavelength band corresponding to each of the color separations. In this manner, a spectral characteristic of a specimen SPC is analyzed, and the shooting is performed by restricting the number of color separations and the spectral wavelength band to the values optimal to obtain spectral information on a subject. Therefore, it is possible to reduce time elapsing until a series of shooting operations are terminated and reduce the image data amount. Since the image data amount is reduced, a load or time necessary to process the image data can be reduced. Furthermore, it is possible to reduce time necessary to transmit the image data.

When a biological tissue is observed using a microscope, a pigment used to dye a single sample is limited. If a spectral characteristic of a subject is measured while the light within the measurement field of the spectroscopic measurement section 120B are mixed, it is possible to obtain average subject spectral information within the measurement field. By performing the shooting based on the color separation characteristic information determined based on the average subject spectral information, it is possible to obtain an image suitable for a spectral characteristic of a sample with a smaller number of color separations.

Modification

Figure 8:
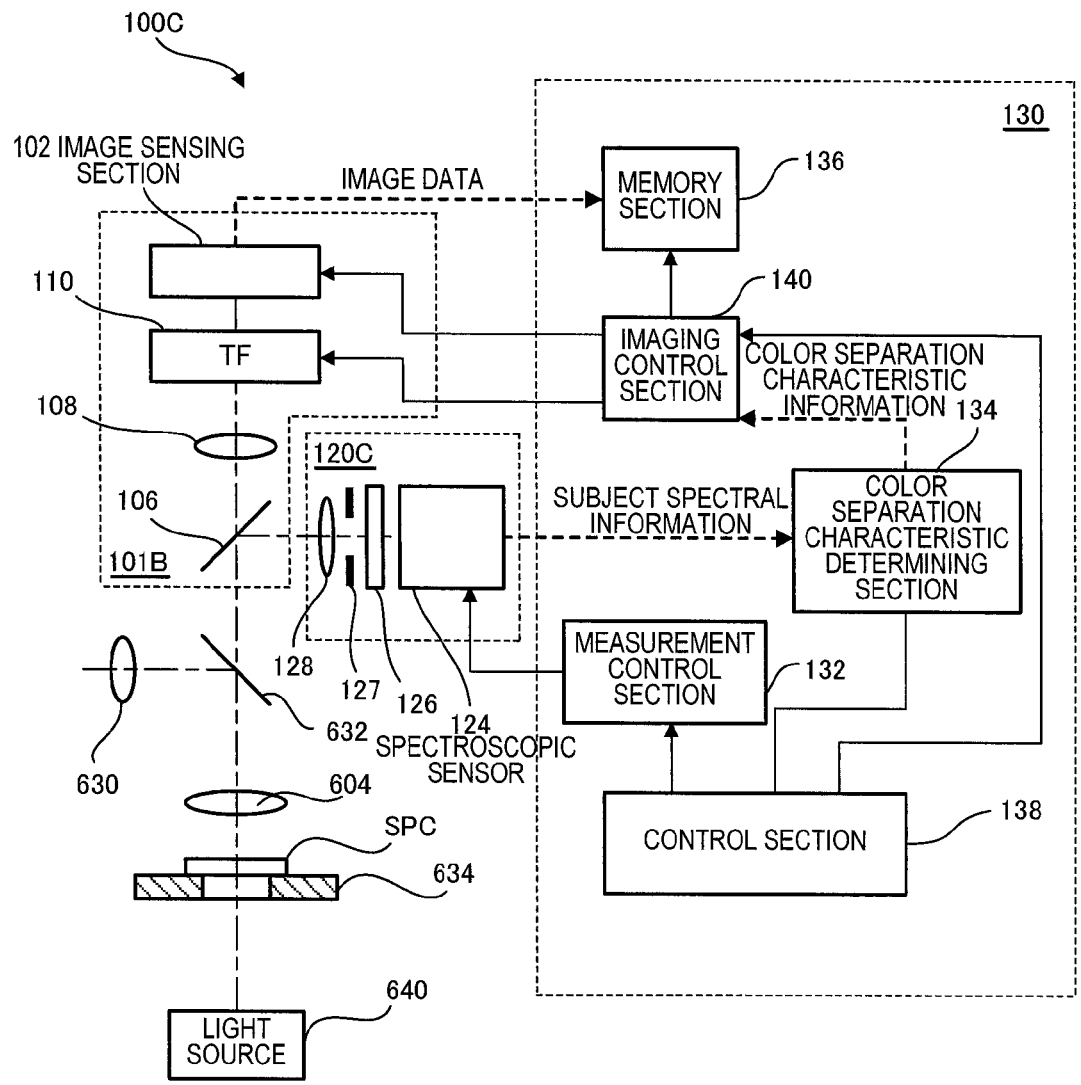
FIG. 8 is a block diagram illustrating an internal configuration of the imaging apparatus according to a modification of the second embodiment of the invention together with a part of elements of the microscope.

Hereinbefore, description has been made with reference to FIG. 7 for an example in which the spectroscopic measurement section 120B has a fixed measurement field. In the following description, an example in which the measurement field is variable will be described as a modification with reference to FIG. 8. FIG. 8 is a block diagram illustrating an internal configuration of the imaging apparatus 100C along with a part of the elements of the microscope 600. FIG. 8 is different from FIG. 7 in a configuration of the spectroscopic measurement section 120C. Other portions are similar to those of FIG. 7.

The spectroscopic measurement section 120C includes an image forming optical system 128, a field stop 127, an optical member 126, and a spectroscopic sensor 124. The image forming system 128 forms an enlarged image of the specimen SPC using the object lens 604 as a real image on the light-receiving surface of the spectroscopic sensor 124. The field stop 127 has a variable aperture mechanism using an iris diaphragm, a turret plate, or the like to change the measurement field of the spectroscopic measurement section 120C. In the following description, it is assumed that the measurement field of the spectroscopic measurement section 120C when the field stop 127 is opened matches the shooting field.

The optical member 126 serves as a diffuser as illustrated in FIG. 7. The optical member 126 may include a transparent plate made of glass or resin provided with minute embossing on a surface such as ground glass or a glass or resin plate having milky white optical diffusing substances dispersed inside. The spectroscopic sensor 124 may be a diffraction spectroscopic measurement type or an imager spectroscopic measurement type. However, the imager spectroscopic measurement type capable of receiving light with a wider range is preferably employed. Light beams of the subject light mixed by the optical member 126 are incident onto the light-receiving surface of the spectroscopic sensor 124. That is, the light beams obtained by mixing overall light within the measurement field of the spectroscopic measurement section 120C is incident onto the light-receiving surface of the spectroscopic sensor 124.

For observation, a user observes an enlarged image of the specimen SPC through the eyepiece lens 630 and manipulates the stage 634 such that a main part of the specimen SPC is positioned in the center of the view field. Then, a user adjusts an aperture size of the field stop 127. For example, it is assumed that a size of the shooting target is approximately ½ of a size of the shooting field of the spectral image capture section 101B. In this case, a user adjusts an aperture diameter of the field stop 127 to a half of the full opening diameter.

Then, as a user performs a shooting manipulation, the controller 130 controls the spectral image capture section 101B and the spectroscopic measurement section 120C as described above in the first embodiment to perform a series of shooting operations. That is, a color separation characteristic in the shooting is determined based on a spectral characteristic of the specimen SPC obtained by the spectroscopic measurement section 120C.

The spectral image capture section 101B performs shooting based on the color separation characteristic. As a result; the shooting is performed using the number of color separations corresponding to a spectral characteristic of a subject, that is, the specimen SPC and a spectral wavelength band corresponding to each of the color separations. When the shooting target is, for example, a pathology specimen, there is a possibility that there is a foreign object in the vicinity of the shooting target. When a spectral characteristic of the foreign object is different from a spectral characteristic of the shooting target, the subject spectral information obtained by measuring the spectroscopic measurement section 120C is influenced by the spectral characteristic of the foreign object. If the color separation characteristic is determined based on such subject spectral information, the shooting may be performed for an unnecessary spectral wavelength band. At this point, in the configuration of FIG. 8, since the measurement field of the spectroscopic measurement section 120C can be adjusted to decrease an influence of a foreign object, it is possible to perform the shooting by limiting the number of color separations and the spectral wavelength band to the values optimal to obtain spectral information on the original shooting target.

On the other hand, in the configuration of FIG. 8, the spectroscopic measurement section 120C may be a multipoint measurement type. That is, an imager spectroscopic measurement type spectroscopic sensor 124 may be employed to obtain the subject spectral information independently for each area within the measurement field of the spectroscopic measurement section 120C. In this case, the field stop 127 may be omitted. In this case, an optical lowpass filter is preferably used as the optical member 126 instead of the diffuser. For example, as described in the first embodiment, in the spectroscopic sensor 124, a single unit of the spectroscopic sensor is configured to have 36 pixels formed with an on-chip color filter capable of reproducing a total of 36 colors in a 2-dimensional array including 6 pixels of a horizontal direction and 6 pixels of a vertical direction, and the units of the spectroscopic sensor are further arranged in a 2-dimensional array. Preferably, an optical property of the optical member 126 is set such that the light beams are incident onto each unit of the spectroscopic sensor in a uniformly mixed manner. Using such a spectroscopic measurement section 120C, it is possible to decrease the influence of a foreign object described above by manually or automatically setting the spectroscopic measurement area within the measurement field of the spectroscopic measurement section 120C.

Hereinbefore, description in the second embodiment has been made for an example in which half mirrors 106 and 632 are provided as an optical path splitting member. As such an optical path splitting member, a movable mirror or the like may be employed. The movable mirror or the like may be inserted into or removed from an optical path of an optical system within the microscope 600 as necessary.

In addition, in the aforementioned example, the shooting target (observation target) is observed using the eyepiece lens 630. However, an image display device may be connected to the controller 130, and the image obtained by the image sensing section 102 may be displayed on the image display device for observation. In this case, when a spectroscopic measurement range is set within the measurement field of the spectroscopic measurement section 120C, the spectroscopic measurement range may be overlappingly displayed on the microscope image displayed on the image display device. As a result, a user can more accurately set the spectroscopic measurement range depending on a size or position of the shooting target.

The type of the microscope or the type of the illumination unit is not limited to those described above. Either an upright microscope or an inverted microscope may be employed depending on purposes. The type of the illumination may include a transparent illumination, a reflective illumination, or a combination of them. In this case, the method of determining the color separation characteristic in the color separation characteristic deter mining section 134 described above in conjunction with FIG. 3 may change depending on the type of the illumination or the type of the microscope.

Third Embodiment

Figure 9:
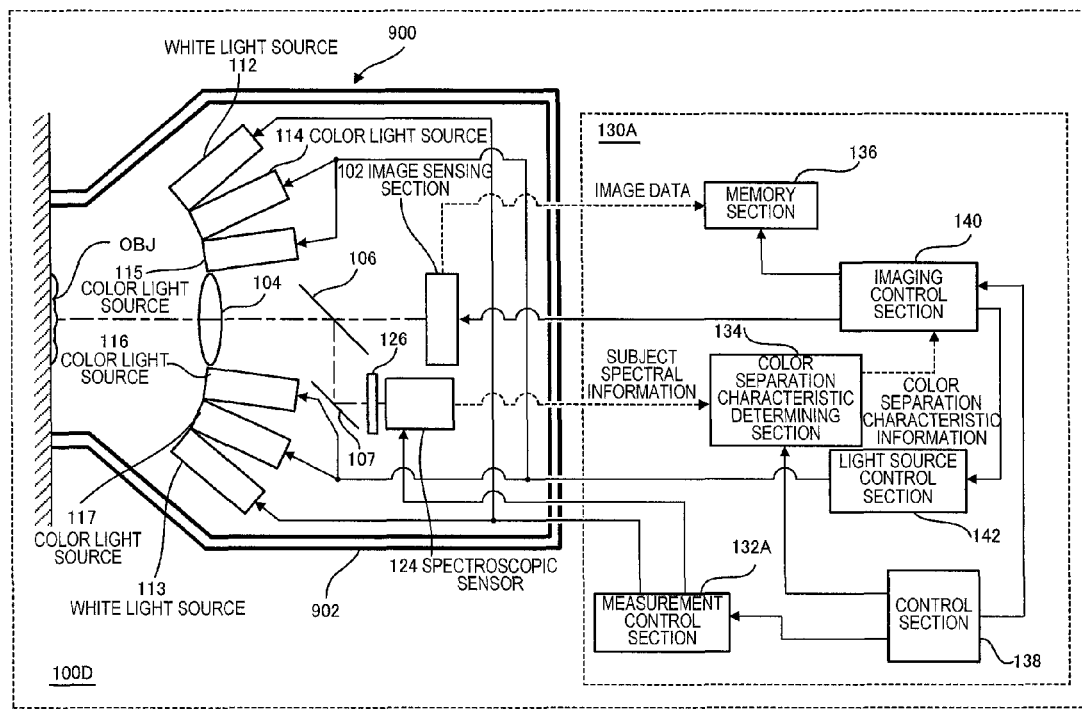
FIG. 9 is a block diagram illustrating an internal configuration of an imaging apparatus according to a third embodiment of the invention.

An imaging apparatus according to a third embodiment is a close-up shooting type in which an illumination light source is embedded. FIG. 9 is a block diagram schematically illustrating an internal configuration of the imaging apparatus 100D. In FIG. 9, like reference numerals denote like elements as in the imaging apparatus 100 of the first embodiment of FIG. 2, and description thereof will not be repeated.

The imaging apparatus 100D includes a camera unit 900 and a controller 130A. The camera unit 900 includes a photographic lens 104, white light sources 112 and 113, color light sources 114, 115, 116, and 117, a half mirror 106, a mirror 107, an optical member 126, a spectroscopic sensor 124, and an image sensing section 102 housed in a camera body 902.

The white light sources 112 and 113 include a light-emitting element such as an LED or an organic EL that covers a sensible spectrum band of the image sensing section 102 and has an approximately uniform spectral radiance characteristic. In FIG. 9, the camera unit 900 has two white light sources 112 and 113. However, the number of white light sources may be arbitrarily set. Each of the color light sources 114 to 117 has a different spectral radiance characteristic. In FIG. 9, four color light sources 114 to 117 are illustrated by way of example. However, the number of color light sources may be arbitrarily set. In this case, by arranging the color light sources along a concentric circle or a spiral circle surrounding the photographic lens 104, it is possible to arrange a plurality of color light sources.

Such a color light source preferably has various spectral radiance characteristics. For example, the color light source may cover a sensible band of the image sensing section 102 as a whole by mixing a plurality of color light sources having different light-emitting center frequencies. Preferably, a plurality of color light sources may have the same light-emitting center frequency while some color light sources have a wide light-emitting wavelength band, and other color light sources have a narrow light-emitting wavelength band. If the color light source 114 is configured as described above, it is possible to increase freedom of determining the color separation characteristic using the color separation characteristic deter mining section 134. The color light source may include an LED, an organic EL element, a laser diode, and the like. Together with such a color light source, the camera unit 900 may have a filter that can switch the spectral transmittance characteristic.

The mirror 107 is a light guide member for guiding a part of the subject light that does not transmit through the half mirror 106 but is reflected and guided toward the optical member 126 and the spectroscopic sensor 124. The mirror 107 may be either a simple plane mirror or a curved reflection surface mirror. The mirror 107 may include a prism. When the mirror 107 includes a prism, a part of or all of an incident surface, a reflection surface, and an emission surface of the prism may be a curved surface capable of forming an image. Furthermore, in addition to the mirror 107, other optical devices may be provided in the optical path.

The spectroscopic sensor 124 may be either a diffraction spectroscopic measurement type or an imager spectroscopic measurement type. According to the present embodiment, the subject light guided by the half mirror 106 and the mirror 107 is diffused by the optical member 126 serving as a diffuser and is guided to the spectroscopic sensor 124. That is, the subject light within the measurement field is mixedly incident onto the spectroscopic sensor 124.

In the camera unit 900 described above, the color light sources 114 to 117, the photographic lens 104, and the image sensing section 102 constitute a spectral image capture section. That is, the image sensing section 102 performs shooting a plurality of times while spectral radiances of the color light sources change as a whole by switching a light-emitting light source out of the color light sources 114 to 117. As a result, it is possible to perform the shooting by separating the subject image formed by the photographic lens 104 into a plurality of colors to create a set of spectral images.

In addition, the spectroscopic measurement section includes the optical member 126 and the spectroscopic sensor 124. When white light or light equivalent thereto can be created by emitting light in combination of a part of or overall color light sources 114 to 117, the white light sources 112 and 113 may be omitted. As illustrated in FIG. 9, the camera unit 900 is arranged to cover the subject OBJ placed on a flat plate to obtain an image of the subject OBJ through a shooting manipulation described below.

Subsequently, the controller 130A will be described. The controller 130A of the present embodiment is different from the controller 130 of the first embodiment in that the controller 130A further has a light source control section 142 so that the measurement control section 132A controls turning on/off of the white light sources 112 and 113 in addition to the spectroscopic sensor 124.

The measurement control section 132A controls turning on/off of the white light sources 112 and 113 and the spectroscopic measurement operation timing of the spectroscopic sensor 124. That is, the measurement control section 132A outputs a control signal for starting the spectroscopic measurement to the spectroscopic sensor 124 while the white light sources 112 and 113 are turned on. Accordingly, the spectroscopic sensor 124 measures a spectral characteristic of the subject OBJ.

The color separation characteristic determining section 134 determines the number "n" of color separations and a spectral wavelength band corresponding to each of color separations based on the subject spectral information input from the spectroscopic sensor 124. That is, the color separation characteristic determining section 134 determines which of the color light sources 114 to 117 is turned on in each shooting operation in synchronization with the n shooting timings. In this case, it is possible to emit light having a light-emitting center wavelength and a light-emitting wavelength region that may be difficult to obtain from a single color light source by combining a plurality of types of color light sources and emitting light in synchronization with a single shooting timing. In this case, it is also possible to independently control the intensity of the emitted light of each color light source.

Similarly, according to the third embodiment, the shooting count n changes depending on a spectral characteristic of a subject. In an extreme case, when a subject has a monochrome or achromatic color, the shooting count may be set to "1. That is, since the shooting count or the spectral wavelength band is set as many as necessary, it is possible to suppress the shooting operation or the image data from unnecessarily increasing.

The color separation characteristic information determined as described above is output from the color separation characteristic determining section 134 to the imaging control section 140. In addition, the control section 138 sends a control signal for starting the shooting operation to the imaging control section 140. The imaging control section 140 receives the control signal and outputs each control signal to each of the image sensing section 102 and the light source control section 142 based on the color separation characteristic information received from the color separation characteristic determining section 134.

As a result, the shooting operation is performed as follows. Specifically, the light source control section 142 controls the color light sources 114 to 117 such that a spectral radiance characteristic of the illumination light used to illuminate the subject OBJ matches the spectral wavelength band 1. Then, a first shooting operation is performed. Subsequently, the light source control section 142 changes the spectral radiance characteristic of the illumination light to match the spectral wavelength band 2, and then a second shooting operation is performed. Subsequently, in a similar manner, the spectral radiance characteristic of the illumination light is set, and the shooting operation is performed. Finally, the light source control section 142 performs the (n)th shooting operation such that the spectral radiance characteristic of the illumination light matches the spectral wavelength band n. In this manner, the shooting operation is performed by n times by setting different spectral wavelength bands.

The illumination device described in the third embodiment, that is, the color light sources 114 to 117 and the white light sources 112 and 113 may be incorporated into the microscope imaging apparatus described in the second embodiment together with the light source control section 142. In this case, the illumination device may be used as either a transmissive illumination or a reflective illumination. When the illumination device described in the third embodiment is incorporated into the microscope imaging apparatus, the tunable filter 110 of FIG. 7 or 8 may be omitted, and the tunable filter 110 and the illumination device may be used in combination.

Fourth Embodiment

Figure 10:
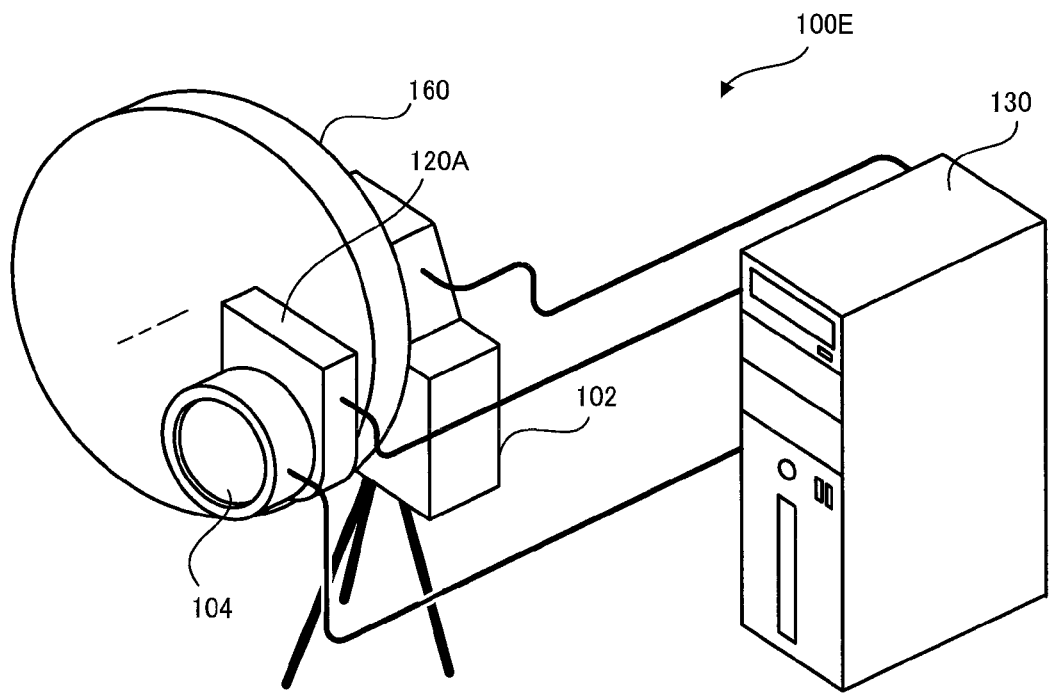
FIG. 10 is a perspective view illustrating a configuration of an imaging apparatus according to a fourth embodiment of the invention.
Figure 11:
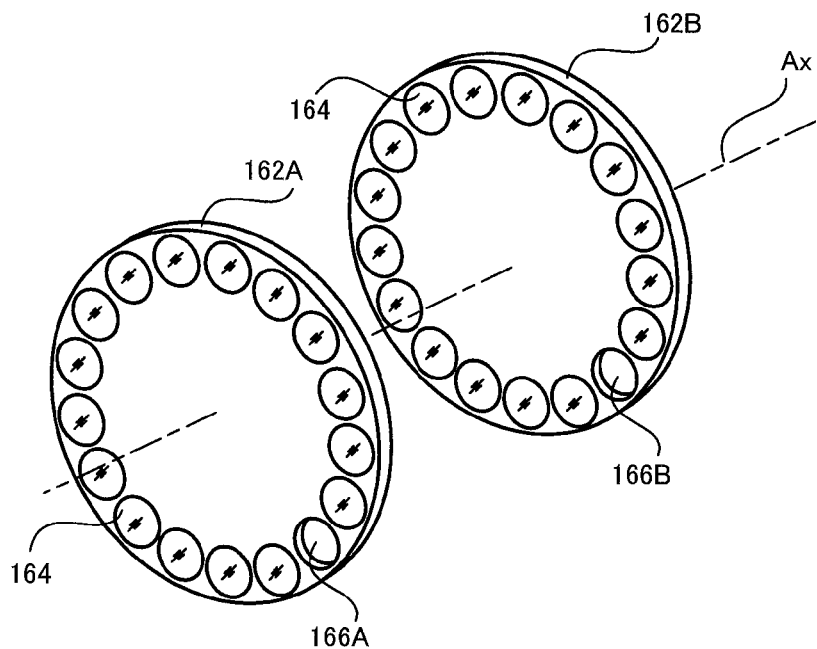
FIG. 11 is a perspective view schematically illustrating a configuration of a turret plate embedded in a filter turret.
Figure 12:
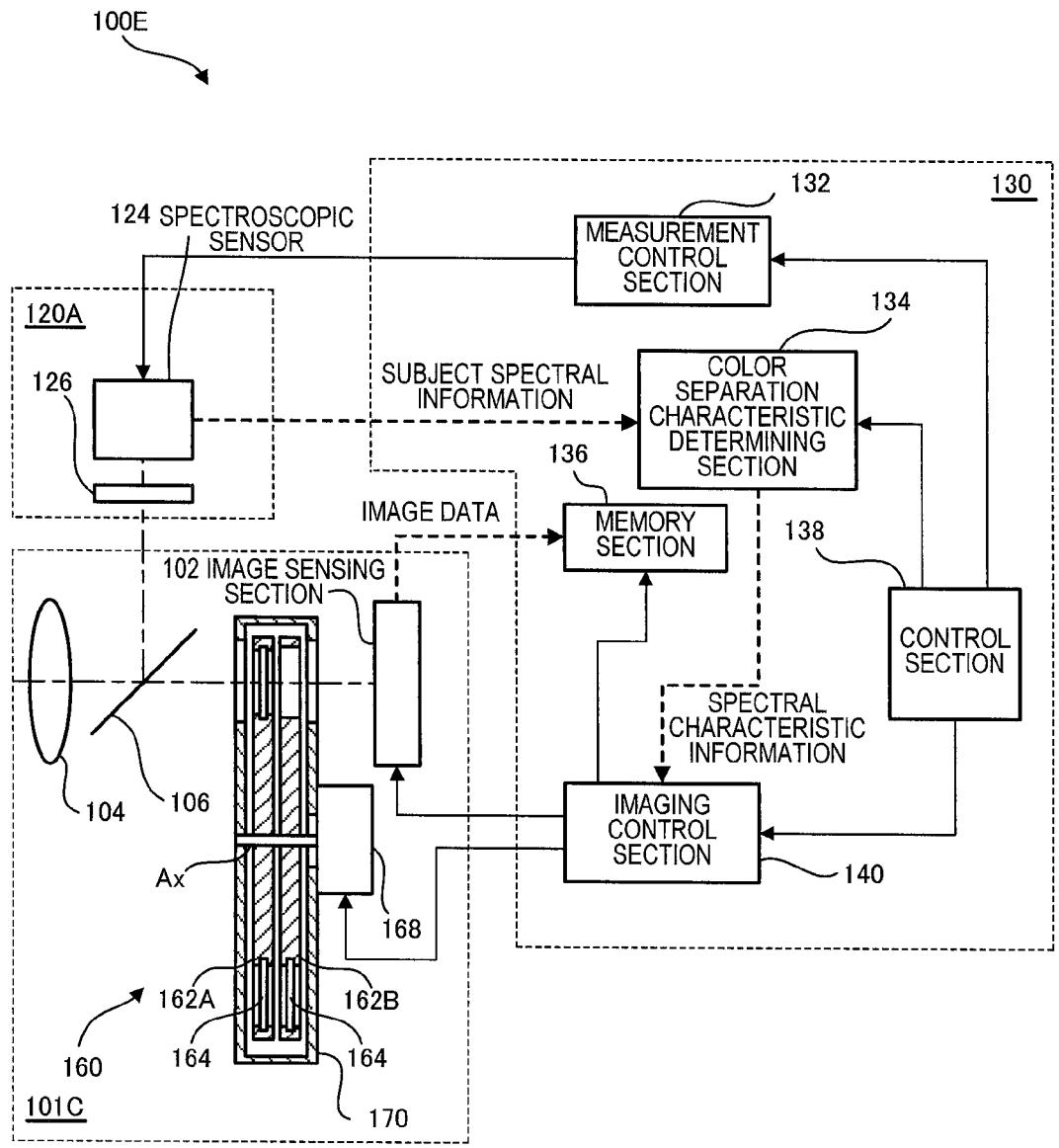
FIG. 12 is a block diagram illustrating an internal configuration of the imaging apparatus according to the fourth embodiment of the invention.

An imaging apparatus 100E according to the fourth embodiment has a turret type filter switching device. The imaging apparatus 100E includes an image sensing section 102, a filter turret 160, a photographic lens 104, a spectroscopic measurement section 120A, and a controller 130. FIG. 11 is a diagram illustrating a configuration example of the turret plates 162A and 162B housed in the filter turret 160. FIG. 12 is a block diagram illustrating an internal configuration of the imaging apparatus 100E. In FIGS. 10 and 12, like reference numerals denote like elements as in the elements of the imaging apparatus 100 of the first embodiment illustrated in FIGS. 1 and 2, and description thereof will not be repeated.

As illustrated in FIG. 10, the spectroscopic measurement section 120A and the filter turret 160 are interposed between the photographic lens 104 and the image sensing section 102. The turret plates 162A and 162B of FIG. 11 are housed in the filter turret 160. In the example of FIG. 11, a pair of turret plates 162A and 162B are housed. However, the number of turret plates housed in the filter turret 160 is not particularly limited. For example, either a single turret plate or a plurality of turret plates may be housed.

In the turret plates 162A and 162B, a plurality of openings are provided along a circumference close to the periphery of a disc-like plate. In each opening, filters 164 having various spectral transmittance characteristics are arranged. In FIG. 11, reference numerals are designated to only a single filter in each turret plate 162A and 162B. The turret plates 162A and 162B are rotatable with respect to the axis Ax, and any filter 164 can be positioned in the optical path of the photographic lens 104. The turret plate 162A and 162B are provided with through-holes 166A and 166B, respectively, where no filter 164 is installed. For example, when the filter 164 provided in the turret plate 162A is positioned in the optical path of the photographic lens 104, the through-hole 166B of the turret plate 162B may be positioned in the optical path of the photographic lens 104. Similarly, when the filter 164 provided in the turret plate 162B is positioned in the optical path of the photographic lens 104, the through-hole 166A of the turret plate 162A may be positioned in the optical path of the photographic lens 104.

When it is necessary to perform the shooting without using a filter, both the through-holes 166A and 166B of the turret plates 162A and 162B, respectively, may be positioned in the optical path of the photographic lens 104. The optical path length in the filter turret 160 in terms of the air is different between when the filter 164 exists in the optical path of the photographic lens 104 and when no filter 164 exists. When this difference makes a problem, a colorless transparent parallel flat plate may be arranged in a position corresponding to the through-hole 166A or 166B. As a result, it is possible to position a pair of filters including a colorless transparent parallel flat plate in the optical path of the photographic lens 104 at all times regardless of the spectral transmittance characteristic set by the filter turret 160.

Alternatively, a colorless transparent filter may be provided in any one of the turret plates 162A and 162B separately from the through-holes 166A and 166B. When a color filter is necessary, the color filter and the through-hole 166A or 166B are combined. Meanwhile, when a color filter is not necessary, the colorless transparent filter and the through-hole 166A (or 166B) are combined. In this manner, it is possible to position at least one filter in the optical path of the photographic lens 104 at all times regardless of the set spectral transmittance characteristic. As a result, it is possible to provide an approximately uniform optical path length in terms of the air.

Referring to FIG. 12, the filter turret 160 includes a housing 170 that houses and covers the turret plates 162A and 162B and a filter driving unit 168 that drives the turret plates 162A and 162B. The filter driving unit 168 includes an encoder or a switch capable of detecting angular positions of each turret plate 162A and 162B, that is, which filter 164 is positioned in the optical path of the photographic lens 104.

The image sensing section 102, the filter turret 160, and the photographic lens 104 constitute a spectral image capture section 101C. That is, the image sensing section 102 performs the shooting several times by switching the spectral transmittance characteristic of the filter turret 160. As a result, it is possible to perform the shooting by separating a subject image formed by the photographic lens 104 into a plurality of colors to create a set of spectral images.

The spectroscopic sensor 124 may be an imager spectroscopic measurement type or a diffraction spectroscopic measurement type. Here, it is assumed that the imager spectroscopic measurement type spectroscopic sensor described in the modification of the first embodiment is employed. That is, for example, a single unit of the spectroscopic sensor is configured to have 36 pixels formed with an on-chip color filter capable of reproducing a total of 36 colors in a 2-dimensional array including 6 pixels of a horizontal direction and 6 pixels of a vertical direction, and the units of the spectroscopic sensor are further arranged in a 2-dimensional array. Naturally, the number of colors may be set to a value greater or smaller than 36. An optical member 126 for reducing a spatial frequency is arranged to cross the optical path of the subject light incident to the spectroscopic sensor 124. This optical member 126 has an optical lowpass filter configuration and uniformly mixes the subject light incident to each unit of the spectroscopic sensor 124.

As described in the modification of the first embodiment, when a size of the light-receiving area of the image sensing section 102 is different from that of the spectroscopic sensor 124, an image re-forming optical system or the like is preferably arranged between the half mirror 106 and the spectroscopic measurement section 120A.

As described in the first embodiment, the controller 130 controls the spectral image capture section 101C and the spectroscopic measurement section 120A such that a series of shooting operations are performed. In this case, the color separation characteristic determining section 134 determines a color separation characteristic in the shooting based on a spectral characteristic of a subject, obtained by the spectroscopic measurement section 120A. The color separation characteristic determining section 134 stores information on the spectral transmittance characteristics of overall filters provided in the filter turret 160. The color separation characteristic determining section 134 selects a filter having a spectral characteristic closest to the determined color separation characteristic. The color separation characteristic deter mining section 134 outputs, to the imaging control section 140, information for specifying a type of the selected filter or information for specifying angular positions of the turret plates 162A and 162B as spectral characteristic info illation.

The imaging control section 140 outputs control signals to each of the image sensing section 102 and the tunable filter 110 based on the color separation characteristic information received from the color separation characteristic determining section 134. As a result, the spectral image capture section 101C performs the shooting operations "n" times by switching a spectral transmittance of the filter turret 160. The image data created by the image sensing section 102 through the "n" shooting operations are output to the memory section 136.

As described above, according to the fourth embodiment, the color separation characteristic in the shooting is determined based on the spectral characteristic of the subject, obtained by the spectroscopic measurement section 120A. In addition, the spectral image capture section 101C performs shooting based on the color separation characteristic. As a result, the shooting is performed using the number of color separations corresponding to the spectral characteristic of the subject and a spectral wavelength band corresponding to such color separations. Typically, an optical filter has high freedom from the viewpoint of setting of the spectral transmittance characteristic. Therefore, if optical filters having various spectral transmittance characteristics are incorporated into the filter turret 160, it is possible to set a color separation characteristic suitable for the spectral characteristic of the subject.

In some cases, the number of filters provided in the turret plates 162 and 162B is restricted depending on sizes of the turret plates 162A and 162B or an intensity of the light beam of the subject light emitted from the photographic lens 104. However, a plurality of turret plates may be prepared by combining different spectral transmittance characteristics, and a turret plate selected therefrom may be incorporated into the filter turret 160. For example, if the type of the subject is known in advance, a turret plate having a filter suitable for the subject may be used.

In the aforementioned description, the turret plate is employed to mechanically switch the type of the filter positioned in the optical path of the photographic lens 104. However, a configuration other than the turret plate may also be employed. For example, the type of the filter may be switched by horizontally or vertically moving a member configured to hold a plurality of types of filters with respect to the optical path of the photographic lens 104. In addition, the mechanically switched filter and the tunable filter described in the first and second embodiments may be used in combination.

The turret type filter switching device described above may be incorporated into the microscope imaging apparatus described in the second embodiment. When the filter switching device described in the fourth embodiment is incorporated into the microscope imaging apparatus, the tunable filter 110 of FIG. 7 or 8 may be omitted, or the tunable filter 110 and the filter turret 160 may be used in combination.

While embodiments of the invention have been described in detail hereinbefore with reference to the accompanying drawings, they not intended to limit the invention to such a specific configuration. Instead, it would be appreciated by those skilled in the art that the embodiments may be changed or modified in various forms within the spirit and scope of the invention and equivalents thereof.

What is claimed is:
1. An imaging apparatus comprising:
an image sensor device; and
a processor comprising hardware, wherein the processor is configured to:

receive a spectral characteristic of a subject, wherein the spectral characteristic is measured by a spectroscopic sensor device;
determine at least one color separation within the spectral characteristic of the subject;
determine a spectral wavelength band for each of the at least one color separation;
control a transmittance characteristic setting of the image sensor device based on the spectral wavelength band; and
control the image sensor device to capture a spectral image of the subject at the transmittance character setting,
wherein the image sensor device comprises:
an image sensor configured to capture the spectral image by photoelectrically converting a subject image formed by at least one image forming optical lens to create an image signal, and
a filter having a variable transmittance characteristic and provided in an optical path of the at least one image forming optical lens to change a spectral characteristic of the subject light incident onto the image sensor, and
wherein the processor is configured to control the transmittance characteristic setting of the image sensor device by controlling the variable transmittance characteristic of the filter, based on the spectral wavelength band.

2. The imaging apparatus according to claim 1,
further comprising the spectroscopic sensor device,
wherein the spectroscopic sensor device is configured to measure the spectral characteristic of the subject within a range substantially matching a shooting field of the image sensor device.

3. The imaging apparatus according to claim 1,
further comprising the spectroscopic sensor device,
wherein the spectroscopic sensor device is configured to measure the spectral characteristic of the subject within a part of a shooting field of the image sensor device.

4. The imaging apparatus according to claim 1,
further comprising the spectroscopic sensor device,
wherein the spectroscopic sensor device is configured to measure the spectral characteristic of the subject in each of a plurality of areas within a shooting field of the image sensor device.

5. The imaging apparatus according to claim 1,
wherein the filter comprises one of a liquid crystal tunable filter and an acousto-optical variable wavelength filter.

6. The imaging apparatus according to claim 1,
wherein the filter comprises:
a plurality of different types of optical filters having different spectral transmittance characteristics; and
a filter switching actuator configured to position an optical filter of the plurality of different types of optical filters in the optical path of the at least one image forming optical lens based on the spectral wavelength band.

7. A microscope system comprising:
a microscope apparatus comprising at least one image forming optical lens; and
the imaging apparatus according to claim 1,
wherein the imaging apparatus is configured to control the image sensor device to capture an enlarged spectral image formed by the microscope apparatus as the spectral image of the subject.

8. An imaging apparatus comprising:
an image sensor device; and
a processor comprising hardware, wherein the processor is configured to:
receive a spectral characteristic of a subject, wherein the spectral characteristic is measured by a spectroscopic sensor device;
determine at least one color separation within the spectral characteristic of the subject;
determine a spectral wavelength band for each of the at least one color separation;
control a transmittance characteristic setting of the image sensor device based on the spectral wavelength band; and
control the image sensor device to capture a spectral image of the subject at the transmittance character setting,
wherein the image sensor device comprises:
an image sensor configured to capture the spectral image by photoelectrically converting a subject image formed by at least one image forming optical lens to create an image signal; and
a light source having a variable spectral radiance characteristic and configured to irradiate illumination light to the subject and change a spectral characteristic of the light used to illuminate the subject, and
wherein the processor is configured to control the transmittance characteristic setting of the image sensor device by controlling the variable spectral radiance characteristic of the light source to have a spectral radiance characteristic, based on the spectral wavelength band.

9. The imaging apparatus according to claim 8,
further comprising the spectroscopic sensor device,
wherein the spectroscopic sensor device is configured to measure the spectral characteristic of the subject within a range substantially matching a shooting field of the image sensor device.

10. The imaging apparatus according to claim 8,
further comprising the spectroscopic sensor device,
wherein the spectroscopic sensor device is configured to measure the spectral characteristic of the subject within a part of a shooting field of the image sensor device.

11. The imaging apparatus according to claim 8,
further comprising the spectroscopic sensor device,
wherein the spectroscopic sensor device is configured to measure the spectral characteristic of the subject in each of a plurality of areas within a shooting field of the image sensor device.

12. The imaging apparatus according to claim 8,
wherein the light source is configured to irradiate white light to the subject when the spectroscopic sensor device measures the spectral characteristic of the subject.

13. A microscope system comprising:
a microscope apparatus comprising at least one image forming optical lens; and
the imaging apparatus according to claim 8,
wherein the imaging apparatus is configured to control the image sensor device to capture an enlarged spectral image formed by the microscope apparatus as the spectral image of the subject.

* * * * *